(12) United States Patent
Chao et al.

(10) Patent No.: US 7,483,088 B2
(45) Date of Patent: Jan. 27, 2009

(54) TUNABLE TERAHERTZ WAVELENGTH SELECTOR DEVICE USING MAGNETICALLY CONTROLLED BIREFRINGENCE OF LIQUID CRYSTALS

(75) Inventors: Ru-Pin Chao, Hsinchu (TW); Ci-Ling Pan, Hsinchu (TW); Chao-Yuan Chen, Jhubei (TW)

(73) Assignee: National Chiao Tung University, Hsinchu (TW)

( * ) Notice: Subject to any disclaimer, the term of this patent is extended or adjusted under 35 U.S.C. 154(b) by 240 days.

(21) Appl. No.: 11/606,217

(22) Filed: Nov. 29, 2006

(65) Prior Publication Data

US 2009/0002581 A1   Jan. 1, 2009

(30) Foreign Application Priority Data

Aug. 28, 2006   (TW)   ............... 95131579 A

(51) Int. Cl.
*G02F 1/137*   (2006.01)
*G02F 1/1347*   (2006.01)

(52) U.S. Cl. .............................. 349/23; 349/18; 349/74; 349/75

(58) Field of Classification Search ................... 349/19, 349/23, 119, 18, 74, 75
See application file for complete search history.

(56) References Cited

U.S. PATENT DOCUMENTS

| H432 H | 2/1988 | Mariani et al. |
|---|---|---|
| 5,568,106 A | 10/1996 | Fang et al. |
| 6,049,726 A | 4/2000 | Gruenwald et al. |
| 6,141,571 A | 10/2000 | Dionne |
| 6,424,466 B1 | 7/2002 | Flanders |
| 6,690,251 B2 | 2/2004 | Toncich |
| 6,724,950 B2 | 4/2004 | Byrne |
| 2005/0024359 A1* | 2/2005 | Pan et al. .................... 345/418 |

OTHER PUBLICATIONS

C. Winnewisser, et al., "Transmisson characteristics of dichroic filters measured by THz time-domain spectroscopy", Appln. Phys. A, 66, pp. 593-598, 1998.

(Continued)

*Primary Examiner*—Brian Healy
*Assistant Examiner*—Michael P Mooney
(74) *Attorney, Agent, or Firm*—Bucknam and Archer

(57) ABSTRACT

The present invention provides a tunable terahertz (THz) wavelength selector device, which includes a fixed phase retarder, a tunable phase retarder and a pair of linear polarizers to form a unit. The fixed phase retarder and tunable phase retarder basically utilizes liquid crystals to provide phase retardation, moreover, utilizing birefringence phenomenon possessed by liquid crystals can provide adequate phase retardation. The fixed phase retarder utilizes horizontal orientation of liquid crystal cell to provide fixed phase retardation, while the tunable phase retarder however utilizes homeotropic liquid crystal cell and a rotatable magnet to provide a tunable phase retardation, wherein the tunable phase retarder can provide the positive or negative phase retardation relative to the fixed phase retarder, based on the direction of the magnet's rotating axes and totally use the entire tunable range into adjusting frequencies which can pass through. Besides, the present invention can also serially connect multiple units described above so as to achieve a narrow enough band-pass bandwidth.

9 Claims, 7 Drawing Sheets

DIAGRAM

OTHER PUBLICATIONS

Timothy D. Drysdale et al., "Transmittance of a tunable filter at terahertz frequencies", Appl. Phys., Letter 85, pp. 5173-5175, 2004.

H. Nemec et al., "Hightly tunable photonic crystal filter for the terahertz range", Mar. 1, 2005/vol. 30, No. 5, pp. 549-551/ Optic Letters.

Stephen Biber et al., "Design and measurement of a bandpass filter at 300 GHz based on a hightly effcient binary grating", IEEE Trans. Microwave Theory and Techniques, vol. 52, No. 9, pp. 2183022189, 2004.

Masaki Tanaka et al., "Electrically controlled millimeter-wave transmission properties of stack-layered liquid crystal cells with metal substrates", Jpn. J. Appl. Phys. vol. 40, pp. 4131-4135, 2001.

F. Yang, et al., "Microwave liquid crystal wavelength selector", Appl. Phys., Letter vol. 79, No. 22, pp. 3717-3719, 2001.

B. Loyt, "Le filter monochromatiquie polarisant et ses applications en physique solaire", Ann. Astrophys., 7, 31, 1994.

Chao-Yuan Chen et al "Liquid-crystal-based terahertz tunable Lyot filter" Applied Physics Letters 88, pp. 101107-1-101107-3 (2006).

* cited by examiner

DIAGRAM

TUNABLE TERAHERTZ WAVELENGTH SELECTOR DEVICE USING MAGNETICALLY CONTROLLED BIREFRINGENCE OF LIQUID CRYSTALS

CROSS-REFERENCES TO RELATED APPLICATION

The present invention generally regards a tunable terahertz wavelength selector device using magnetically controlled birefringence of liquid crystals, and more specifically regards a continuous tunable terahertz wavelength selector device or filter created by phase retarder provided by using liquid crystals, so as to be used in different kinds of applications of terahertz wavelength (THz, 1THz=$10^{12}$ Hz) and electromagnetic waves (that is, sub-millimeter).

BACKGROUND OF THE INVENTION

In the recent years, applications of wireless waves and microwaves revealed infinite potentiality, as for example mobile communications and wireless networks et cetera are the most popular industry. The trend of this one field is to develop towards higher frequencies, in future millimeter and even sub-millimeter wavelengths will be used. Usually, because of the lack of wave source and detector, therefore applications of sub-millimeter wavelength magneto-rheological fluid are comparatively less. In the recent ten years, due to motivation and coherence by lasers, development of terahertz technology are maturing with each passing day, in Time-Domain Spectroscopy, applications of THz imaging and medical areas all displayed extremely huge development potentiality of terahertz wavelength. Besides this, THz (terahertz) communications and phase radar technologies are more important areas of research. Nevertheless, the above described applications usually requires THz optic components such as polarizer, filter, phase shifter, and wavelength selector device et cetera, so as to serve use in signal processing.

At present, in the already published documents, it is known that terahertz filter or wavelength selector device was first published in Applied Physics by C. Winnewisser et al. on March 1998, it mainly utilizes periodic holes created on metallic slabs, so when terahertz waves passes through this structure, it is just like passing through two-dimensional grating or photon crystals, wherein some wavelengths have specifically high transparency, while terahertz waves of some frequencies cannot pass through, utilizing this, function of wave selecting is achieved. Utilizing this structure as basis, T. D. Drysdale et al. utilized relative motion of two layers of one-dimensional grating to produce changes in periodic structures, and then succeeded in adjusting frequencies allowed to pass through, and H. Nemec et al. clipped dielectric materials in between the two layers of periodic structures, wherein the dielectric constant of the dielectric materials changes with change in temperature, utilizing this, through temperature adjustments, frequencies allowed to pass through can be changed. Besides this, Stephan Biber et al. also utilized the known grating technology and successfully accomplished applications of wavelength selector device under terahertz wavelengths. In spite of these wavelength selector device using photon crystals as basis (such as, filters) possesses good filtrate functions, yet its exceedingly low frequency adjusting range (<20%) or range of temperatures required for change being exceedingly high (100 K~300 K) both increased the difficulty in its applications.

In microwaves or sub-micrometer wavelengths, utilizing liquid crystals in tunable wavelength selector device has already being discussed widely. M. Tanaka and F. Yang et al. utilized metal laminates to create Stack-Layered Liquid Crystal Cell), in reality it also utilizes electric fields to change the refraction constant of the liquid crystal and then adjusts it to one dimensional periodic structure, only it alone is suitable for use in millimeter wave ranges, due to wavelength of electromagnetic waves in terahertz wavelength being very small, hence accomplishing this structure in terahertz wavelength exists certain difficulties. Applications proclaimed by B. Lyot in 1944, utilizing combinations of phase retarding discs and linear polarizers as wavelength selector is already widely known, but to date it is not yet successfully applied in terahertz wavelengths, it is primarily because: (1) Under this wavelength, suitable phase retarding material has not yet been developed, and (2) On applications of tunable wavelength selector (or filter), it is still required to take into consideration a large enough tunable phase retardation range. In other words, even though use of phase retarder and linear polarizer combination as wavelength selector is already a known technology, yet implementing it in terahertz wavelength poses certain difficulty and limitations, if this method is used to accomplish function of tunable wavelength selecting, its phase retarder should possess a large enough continuous tunable range (>360 deg)

SUMMARY OF THE INVENTION

Hence, the objective of the present invention is to provide a tunable terahertz wavelength selector device using magnetically controlled birefringence of liquid crystals, which is, providing a continuous tunable terahertz wavelength (0.1THz-10 THz) selector device, it is (1) thick liquid crystal cell utilizing magnetic field to stabilize orientation of liquid crystals, serving as component for phase retarder discs, and (2) utilizes a fixed and a tunable liquid crystal phase retarder to form a group of phase retarder and solves the problem of inadequate tunable phase range. Hence, it can overcome variety of known drawbacks, and provide a terahertz wavelength component that can be actually implemented.

To accomplish the objective described above, based on the point of view of the present invention, a tunable wavelength selector device is provided, which includes a fixed phase retarder, first liquid crystal cell possessing a horizontal orientation, a pair of opposite magnet slabs and a first clamp to fix the first liquid crystal cell and the class of magnet slabs, wherein the first liquid crystal cell is set in between the pair of magnet slabs, used for providing fixed phase retardation used in the terahertz wavelength, utilizing orientation of liquid crystal molecule in the first liquid crystal cell; a tunable phase retarder, a second liquid crystal cell possessing vertical orientation, a magnet and a second clamp to fix the second liquid crystal cell and the magnet, wherein the second clamp can rotate the magnet so as to provide variable magnetic field to change the orientation of liquid crystal molecule in the second liquid crystal cell, used for providing positive or negative phase retardation relative to the fixed phase retarder of the terahertz wavelength; and a pair of linear polarizers, separately set adjacent to the deployed fixed phase retarder and tunable phase on both sides, used for attenuating the class of phase retardation which are not integer multiple of $\pi$ in the terahertz wavelength, wherein $\pi$ is the circular constant.

Furthermore, based on the point of view of the present invention described above, wherein the tunable wavelength selector device also includes two or more sets of assembling units possessing the fixed phase retarder, the tunable phase retarder and the pair of linear polarizers, wherein the class of assembling unit are mutually serially connected devices.

Furthermore, based on the point of view of the present invention described above, wherein the liquid crystal of first liquid crystal cell and second liquid crystal cell of the tunable terahertz wavelength selector device are of similar or different kinds and the liquid crystal are structures of single or multi-layered liquid crystals.

Other objectives, characteristics and qualities of the present invention will be presented more clearly from the detailed description of the present invention's preferred implementations combined with attached diagrams.

DETAILED DESCRIPTION OF PREFERRED EMBODIMENTS OF THE INVENTION

The present invention's preferred implementation will refer to attached diagrams and be described as follow.

Based on the present invention of tunable terahertz wavelength selector device using magnetically controlled birefringence of liquid crystals is a tunable wavelength selector device formed by using a fixed phase retarder, a tunable phase retarder, and a pair of linear polarizer aligned in the same direction as a unit. Please consult FIG. 1(a) which depicts the framework representing diagram based on the present invention's better implementations of tunable terahertz wavelength selector device, wherein this implementation is composed from the two units described above, its objective lies in narrowing the bandwidth of the pass through frequency. As shown in the diagram, the tunable wavelength selector device (1000) includes two fixed phase retarders (100 and 300), two tunable phase retarders (200 and 400), and three linear polarizer (500). Wherein, fixed phase retarder (100 and 300) provides fixed phase retardation needed by the wavelength selector (1000), its structure is separately represented as in FIG. 1(b) and FIG. 1(c) (will be described later); and tunable phase retarder (200 and 400) provides positive or negative tunable phase retardation, used for increasing or decreasing phase retardation provided by fixed phase retarder (100 and 300), its structure is separately represented as in FIG. 1(d) and FIG. 1(e) (will be described later). Besides, linear polarizer (500) is used to totally or mostly attenuate the frequency (its advancing direction is represented by symbol (600)) of incident terahertz electromagnetic waves of the phase retardation which are not integer multiple of π (circular constant) and accomplishing objective of frequency selection.

Fixed phase retarder (100 and 300) is formed from homogeneous aligned liquid crystal cell (110, 310), a pair of magnet slabs (120, 320) and clamp (not shown) to fix the liquid crystal cell and magnets (120, 320), as represented in FIG. 1(b) and FIG. 1(c). FIG. 1(b) is the representing structure diagram of fixed phase retarder corresponding to fixed phase retarder (100 and 300) in FIG. 1(a), and FIG. 1(c) corresponds to the liquid crystal cell (110, 310) in FIG. 1(b). The liquid crystal cell (110, 310) is formed by utilizing two slices of quartz glass (or other light pervious base) (111, 311) and dividing body (112, 312) used for controlling thickness, to generate a hollow chamber and then implanting liquid crystal (113, 313) in it, wherein the liquid crystal used in the present implementation are E7 liquid crystal produced by Daily Polymer company, nevertheless, the present invention is not limited to this. Moreover, before implanting liquid crystal (113, 313), a coat of homogeneous aligned film (not shown) such as polyacetamide is painted on the top surface of the quartz glass beforehand, which enables liquid crystal (113, 313) to display homogeneous alignment within the liquid crystal cell, as shown in FIG. 1(c). Due to the thickness of the liquid crystal cell (110, 310) used by fixed phase retarder (100 and 300) of the present implementation being considerably thick, as for example it separately is 9 mm (110) and 4.5 mm (310), that is why a pair of magnets (120, 320) is used to provide magnetic field (114, 314) so as to obtain stable orientation (130, 330) of liquid crystal layers.

Consult FIG. 1(d) and FIG. 1(e), FIG. 1(d) depicts the representing structure diagram of tunable phase retarder (200, 400) based on the present invention's implementation, and FIG. 1(e) depicts the representing structure diagram of liquid crystal cell (210, 410) in FIG. 1(d). As represented in the diagram, the tunable phase retarder (200, 400) is formed from homeotropic aligned liquid crystal cell (210, 410), magnet (220, 420) used to provide magnetic field, and clamp such as to fix rotating mechanism (230, 430) of magnet, to fix the magnet (220, 420) and the liquid crystal cell (210, 410). Wherein, the magnet (220, 420) can rotate along the rotating axes (250, 450) and provides magnetic field (240, 440) that can change direction, while then changing orientation of liquid crystal molecules in the liquid crystal cell. FIG. 1(e) corresponds to the liquid crystal cell (210, 410) in FIG. 1(d), the liquid crystal cell (210, 410) utilizes two slices of quartz glass (or other light pervious base) 211 and 411 and dividing body (213, 413) used for controlling thickness, to generate a hollow chamber and then implanting liquid crystal cell (212, 412) in it, this part still uses E7 liquid crystal described above, nevertheless, the present invention is not limited to this. Moreover, before implanting liquid crystal (212, 412), a coat of homeotropic aligned film (DMOPA) (not shown) is painted on the top surface of the quartz glass beforehand, which enables liquid crystal (212, 412) to display homeotropic alignment within the liquid crystal cell (210, 410), as shown in FIG. 1(e). The thickness of the liquid crystal used in this part is separately 4 mm (210) and 2 mm (410). Besides this, the optic axes of the fixed phase retarder and tunable phase retarder can be perpendicular or parallel to each other.

Based on the implementation of the present invention, it also has comparison on theory and simulation, as for example when electromagnetic waves passes through the combination of phase retarder and linear polarizer as described in the present implementation, its Transparency (T) is expressed as follows:

$$T = \cos^2\left(\frac{\Gamma_A + \Delta\Gamma_A}{2}\right) \cdot \cos^2\left(\frac{\Gamma_B + \Delta\Gamma_B}{2}\right) \qquad (1)$$

Wherein $\Gamma_A$ and $\Gamma_B$ are the phase retardation provided by fixed phase retarder (100, 300), and $\Delta\Gamma_A$ and $\Delta\Gamma_B$ are the tunable phase retardation provided by tunable phase retarder (200, 400), wherein $\Delta\Gamma_A$ and $\Delta\Gamma_B$ can be positive values (magnet's rotating axes is perpendicular to direction of liquid crystal optic axes of fixed phase retarder), or negative values (magnet's rotating axes is parallel to direction of liquid crystal optic axes). During the course of adjustments, the $\Gamma_A + \Delta\Gamma_A : \Gamma_B + \Delta\Gamma_B = 2:1$ relationship is maintained so as to maintain the peak values of the transparency of the two parts to happen at the same frequency. Then, the result simulated by this theory is compared with an experimental data of the implementation. Please consult FIG. 2(a), vertical axes is the normalized transparency, wherein the solid dot is the data measured by the experiment, the curve is the theoretical value obtained from formula (1). Its measured result matches very well with theory. FIG. 2(b) is the comparison between measured data and theoretical curve of changing phase retardation provided by tunable phase retarder and accomplishing objective of wavelength selection. In the present implementation, its tunable range is 0.388 THz~0.564 THz, which is very close to the theoretical curve.

As described above, even though the principle of utilizing combination of phase retarder and linear polarizer to filter unwanted frequencies is a known technology, yet the main implication of the present invention is not utilizing the known technology to accomplish function of wave filtering or wavelength selection, but a technology utilizing birefringence effect of liquid crystals to provide phase retardation, wherein the present invention utilizes a phase retarder which can provide fixed phase retardation and a tunable phase retarder which can provide tunable phase retardation collocation to provide wavelength selector (or known as filter) to accomplish objective of tunable wavelength. Based on this, as described in better implementation described above, the tunable phase retardation provided by the tunable phase retarder can be totally used in adjusting wavelength.

Hence, the present invention is a filter or wavelength selector developed using birefringence effect of liquid crystals suitable for use in space terahertz electromagnetic waves or standard far infrared light source. The present invention besides, in compliance with different requirements, from being able to provide large range, high efficiency and continuous tunable passive wavelength selecting, its operating temperature can also be set to meet requirements, as for example, liquid crystals used by the better implementation described above is suitable for use in room temperature. Therefore, in comparison to known technology wavelength selector, the present invention not only possesses potential but also handy outside of applications, moreover, it possesses characteristics such as being more compact and low operating voltage.

Even though the present invention is disclosed on already implemented example as above, nevertheless, it is not used to limit the present invention, anyone familiar with this type of technology, even though, using magnet slabs as tools for providing magnetic field to stabilize orientation of liquid crystal cell of fixed phase retarder is only disclosed, yet the present invention is not limited to this; as for example tools for providing magnetic field is not limited to this form, it can also be provided by multiple groups of magnets, permanent magnets or electromagnets of different shapes, besides this, electric field, multi-layered structure or other forms can also be used to accomplish stabilizing of liquid crystal arrangement. Hence, the protective boundary of the present invention is as according to the claims fixed which is annexed thereinafter.

From the detailed description of the better concrete implementation above, is to hope that the characteristic and spirit of the present invention can be depicted more clearly, and not additionally limit the boundary of the present invention with the better concrete implementation that must be described above. On the contrary, its objective hopes to cover different changes and arrangements of equal effect within the boundaries applied by the present invention.

DESCRIPTION OF MAIN COMPONENT SYMBOLS

Figure 1A:
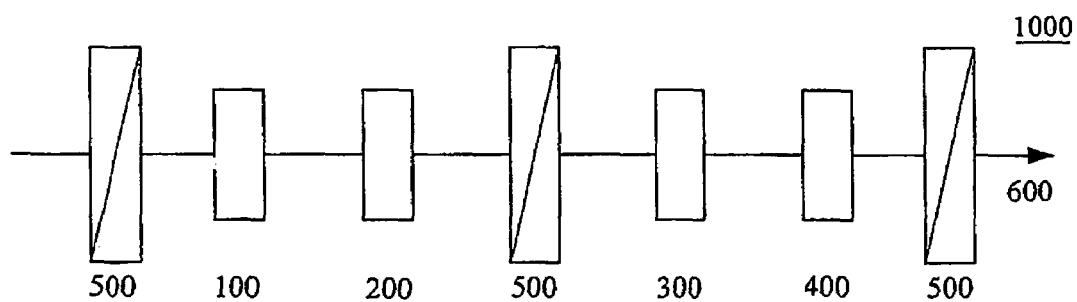
FIG. 1(a) is the representing diagram, depicting the framework of terahertz tunable wavelength selector device according to the present invention's implementation.
Figure 1B:
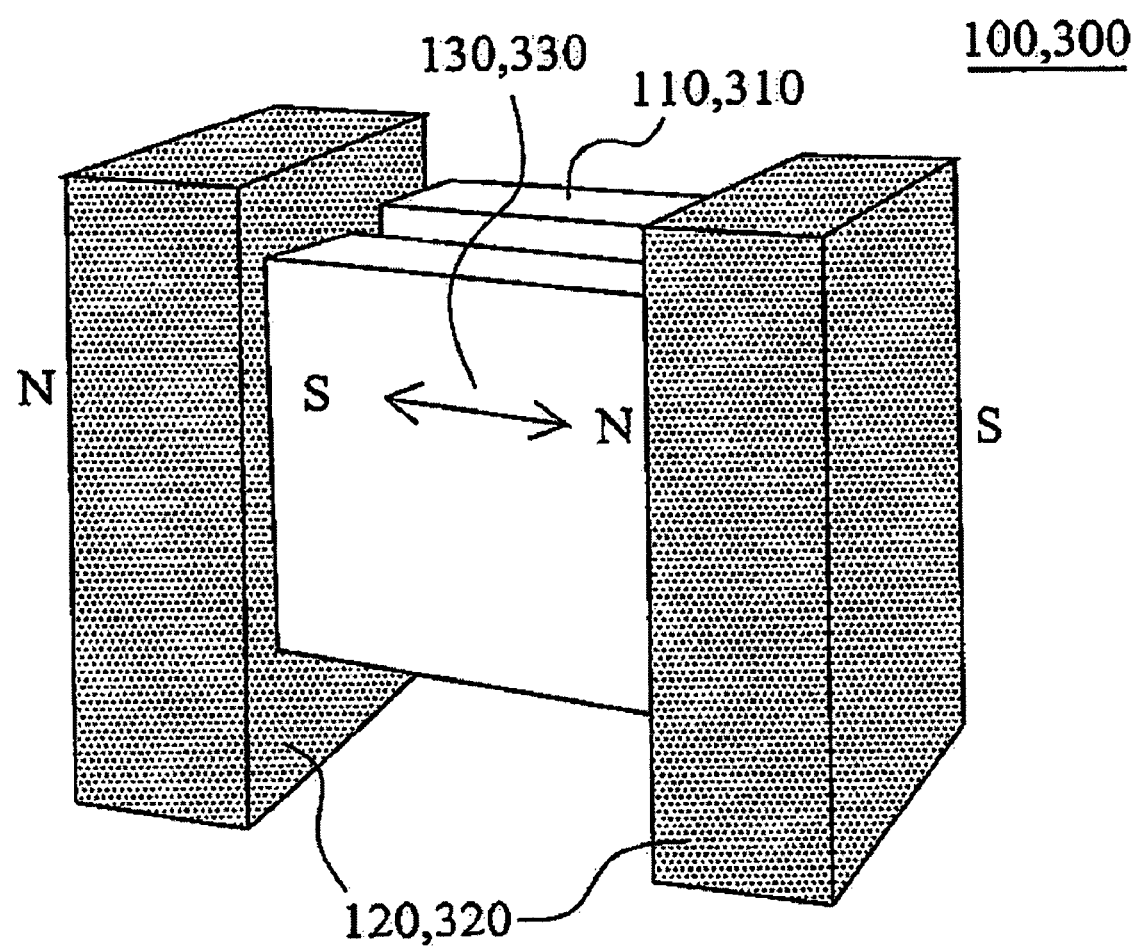
FIG. 1(b) is the representing diagram, depicting the framework of fixed phase retarder according to the present invention's implementation.
Figure 1C:
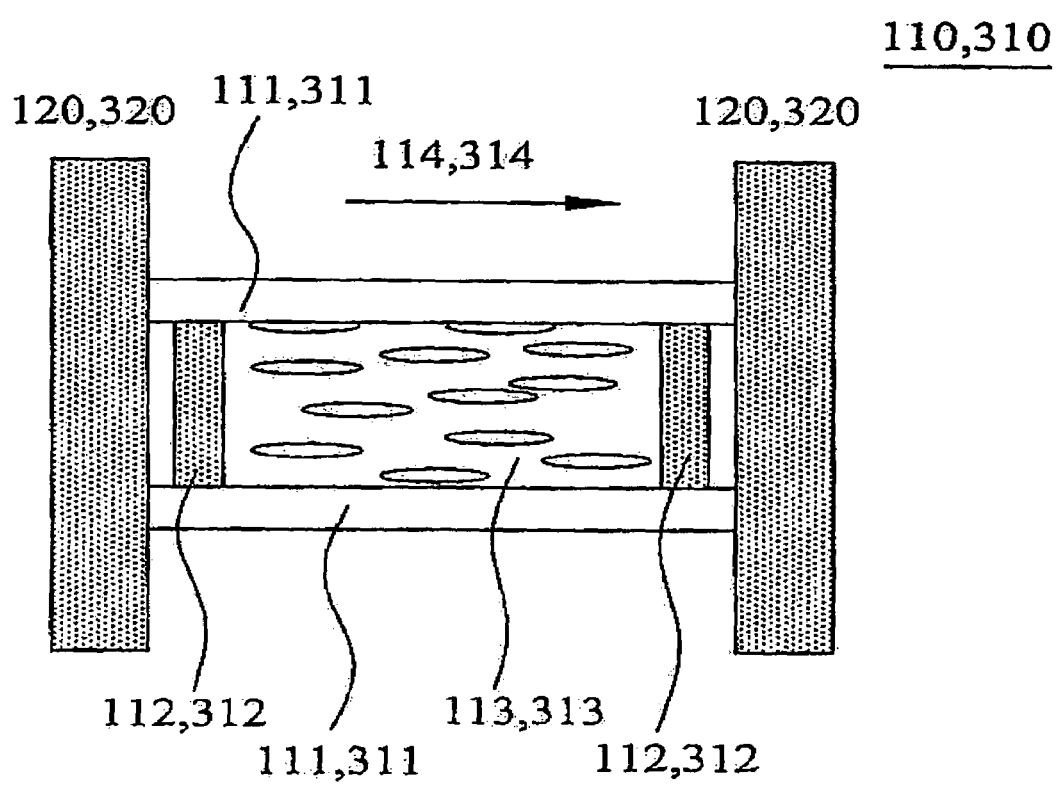
FIG. 1(c) is the representing diagram, depicting the framework of liquid crystal cell of fixed phase retarder in FIG. 1(b)
Figure 1D:
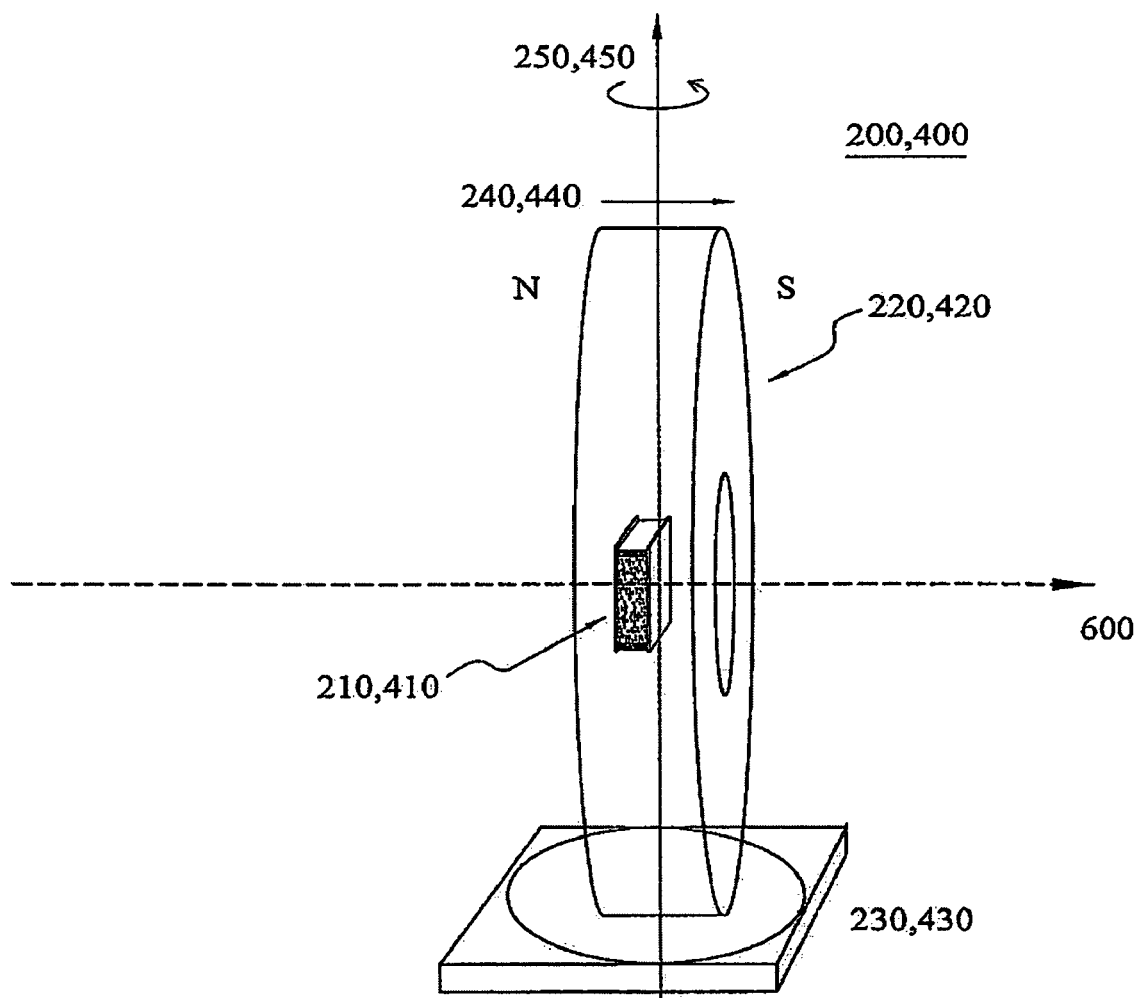
FIG. 1(d) is the representing diagram, depicting the framework of tunable phase retarder according to the present invention's implementation.
Figure 1E:
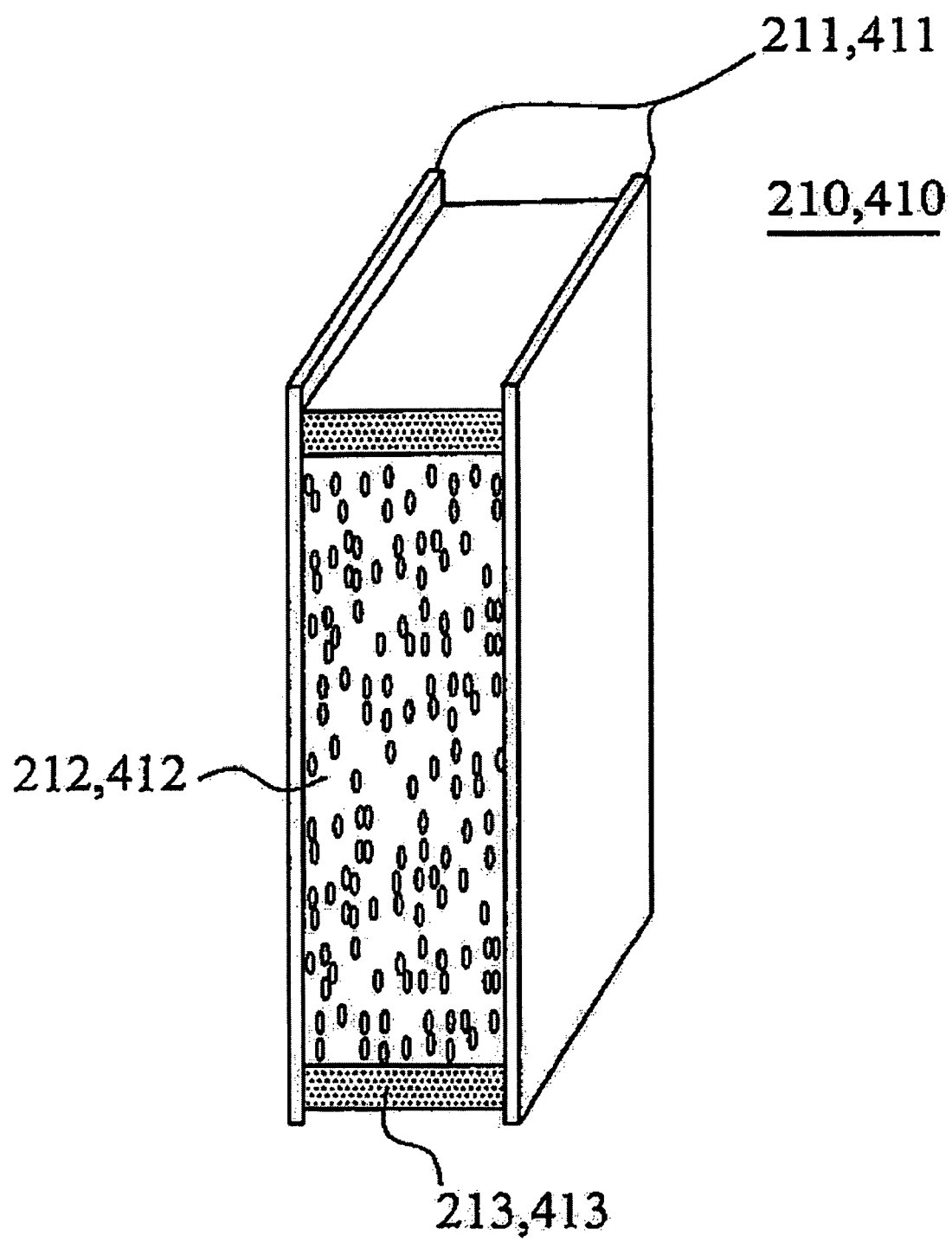
FIG. 1(e) is the representing diagram, depicting the framework of liquid crystal cell of tunable phase retarder in FIG. 1(d)
Figure 2A:
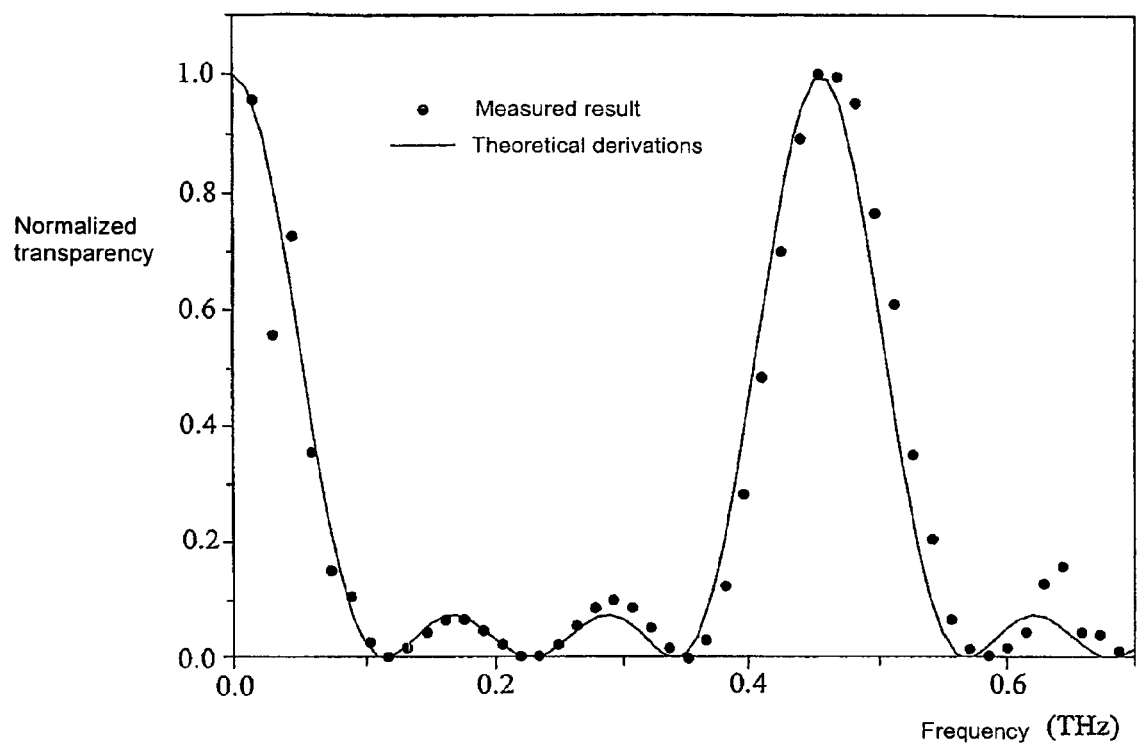
FIG. 2(a) is the comparison of theoretical simulation and experimental result according to the present invention's implementation, wherein the dots represent result measured by experiment, solid lines represent result calculated by theory.
Figure 2B:
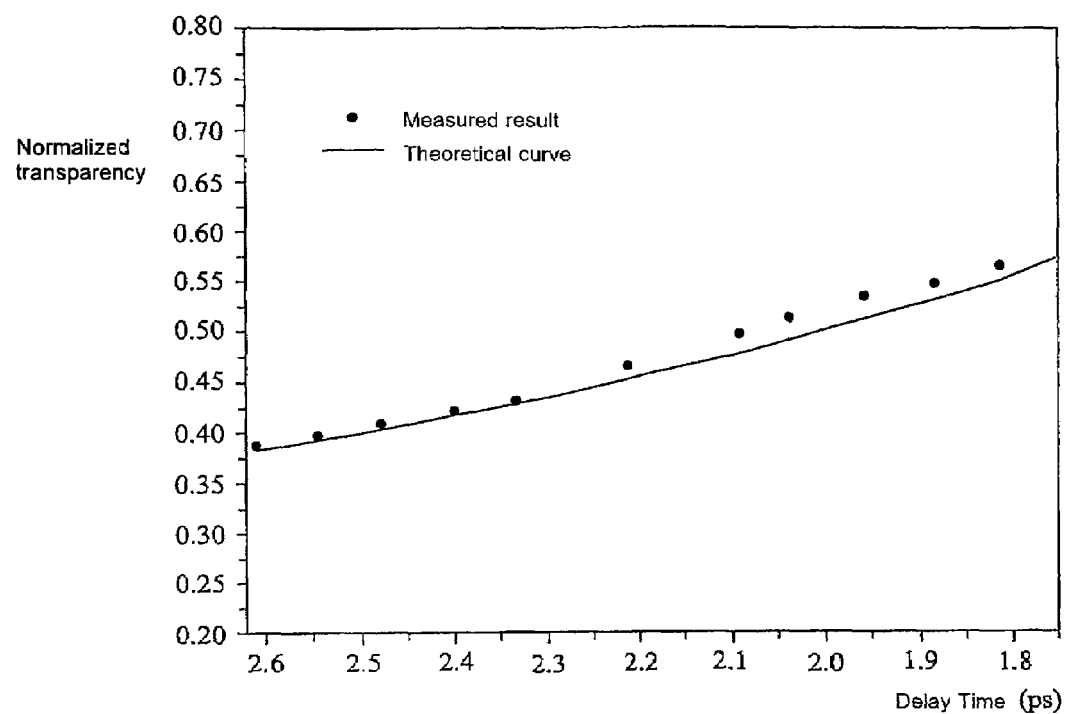
FIG. 2(b) is the comparison of experimental result and theoretical calculation of peak of transparency according to the present invention's implementation, wherein the dots represent result measured by experiment, solid lines represent result calculated by theory.

| Description of main component symbols | |
|---|---|
| 100 | Fixed phase retarder |
| 110 | Liquid crystal cell |
| 111 | Quartz glass |
| 112 | Dividing body |
| 113 | Liquid crystal |
| 114 | Direction of magnetic field |
| 120 | Magnet |
| 130 | Orientation of liquid crystal molecule |
| 200 | Tunable phase retarder |
| 210 | Liquid crystal cell |
| 211 | Quartz glass |
| 212 | Liquid crystal |
| 213 | Dividing body |
| 220 | Magnet |
| 230 | Rotating mechanism for fixing magnet |
| 240 | Direction of magnetic field |
| 250 | Rotating direction of magnet |
| 300 | Fixed phase retarder |
| 310 | Liquid crystal cell |
| 311 | Quartz glass |
| 312 | Dividing body |
| 313 | Liquid crystal |
| 314 | Direction of magnetic field |
| 320 | Magnet |
| 330 | Orientation of liquid crystal molecule |
| 400 | Tunable phase retarder |
| 410 | Liquid crystal cell |
| 411 | Quartz glass |
| 412 | Liquid crystal |
| 413 | Dividing body |
| 420 | Magnet |
| 430 | Rotating mechanism for fixing magnet |
| 440 | Direction of magnetic field |
| 450 | Rotating direction of magnet |
| 500 | Linear polarizer |
| 600 | Advancing direction of terahertz wave |
| 1000 | Wavelength selector |

The invention claimed is:

1. A tunable terahertz (THz) wavelength selector device includes:

a fixed phase retarder which includes a homogeneous aligned first liquid crystal cell, a pair of opposite magnet slabs, and a first clamp to fix the first liquid crystal cell and the class of magnet slabs, wherein the first liquid crystal cell is set in between the pair of magnet slabs, used for providing fixed phase retardation used in the terahertz wavelength, utilizing orientation of liquid crystal molecule in the first liquid crystal cell;

a tunable phase retarder which includes a homeotropic aligned second liquid crystal cell, a magnet, and a second clamp to fix the second liquid crystal cell and the magnet, wherein the second clamp can rotate the magnet so as to provide variable magnetic field to change the orientation of liquid crystal molecule in the second liquid crystal cell, used for providing positive or negative phase retardation relative to the fixed phase retarder of the tera hertz wavelength; and a pair of linear polarizers, separately set adjacent to the deployed fixed phase retarder and tunable phase on both sides, used for attenuating the class of phase retardation which are not integer multiple of $\pi$ in the terahertz wavelength, wherein $\pi$ is the circular constant.

2. The tunable terahertz wavelength selector device as claimed in claim 1, wherein the tunable terahertz wavelength selector device also includes two or more sets of assembling units possessing the fixed phase retarder, the tunable phase retarder and the pair of linear polarizers, wherein the class of assembling unit are mutually serially connected devices.

3. The tunable terahertz wavelength selector device as claimed in claim 1, wherein the liquid crystals contained within the first liquid crystal cell and the second liquid crystal cell are similar kinds of liquid crystals.

4. The tunable terahertz wavelength selector device as claimed in claim 1, wherein the liquid crystals contained within the first liquid crystal cell and the second liquid crystal cell are different kinds of liquid crystals.

5. The tunable terahertz wavelength selector device as claimed in claim 3, wherein the liquid crystals are structures of single or multi-layered liquid crystals.

6. The tunable terahertz wavelength selector device as claimed in claim 1, wherein the magnet slabs and the rotatable magnet are anyone kind of permanent magnet and electromagnet.

7. The tunable terahertz wavelength selector device as claimed in claim 1, wherein the first clamp is of fixed kind and the second clamp is of rotatable kind.

8. The tunable terahertz wavelength selector device as claimed in claim 1, wherein the optic axes of the fixed phase retarder and the tunable phase retarder are perpendicular or parallel to each other.

9. The tunable terahertz wavelength selector device as claimed in claim 4, wherein the liquid crystals are structures of single or multi-layered liquid crystals.

* * * * *